Oct. 2, 1962 B. L. FLYNN 3,056,608
SEALING ASSEMBLY
Filed July 16, 1959
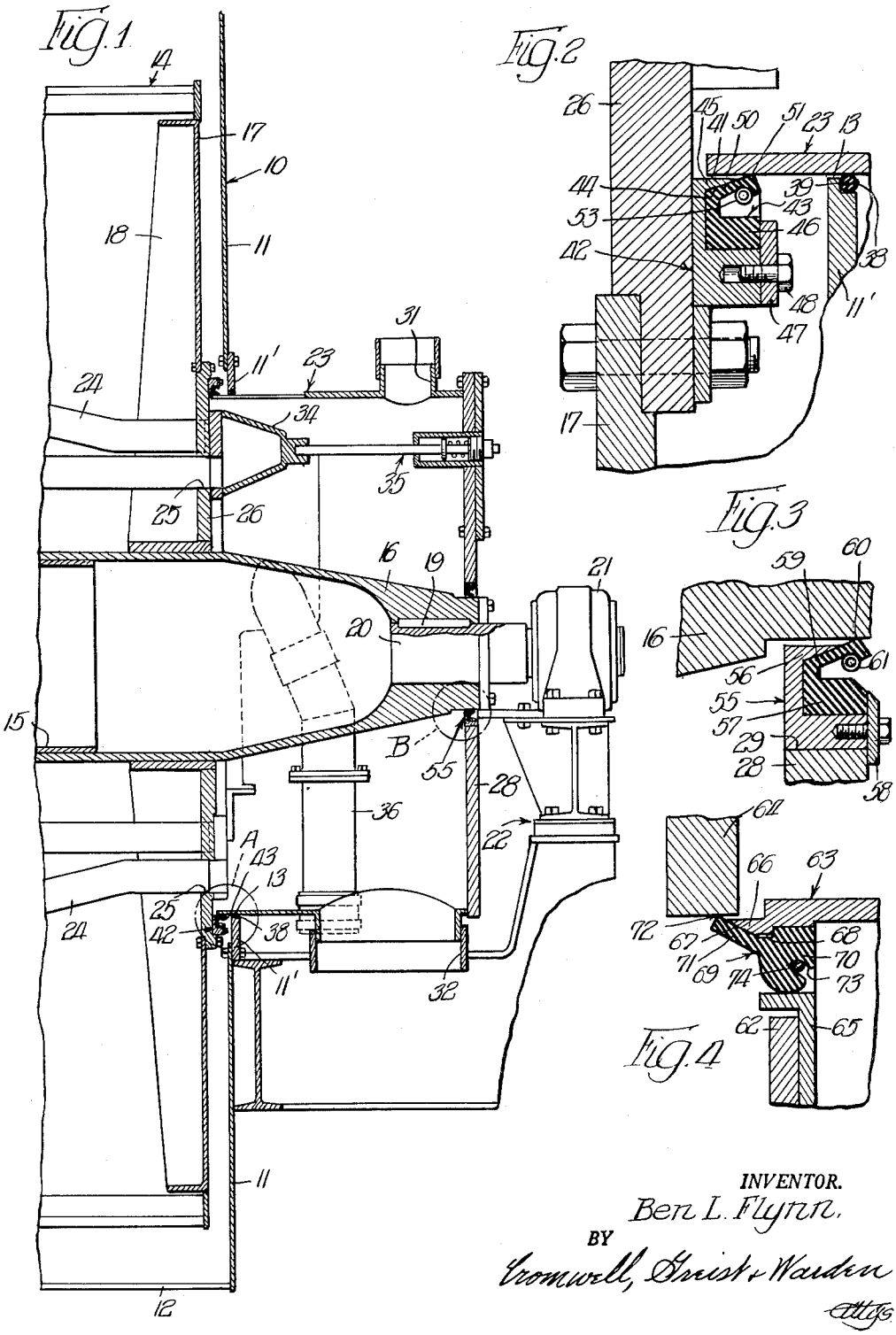
INVENTOR.
Ben L. Flynn,
BY
Cromwell, Greist & Warden
Attys.

3,056,608
SEALING ASSEMBLY
Ben L. Flynn, Harvey, Ill., assignor to Whiting Corporation, a corporation of Illinois
Filed July 16, 1959, Ser. No. 827,492
2 Claims. (Cl. 277—170)

The present invention relates to a sealing assembly and, more particularly, to an improved sealing assembly for rotary drum-type pulp washers and filters.

It is an important object of the invention to provide a new and improved sealing assembly for a pair of relatively movable members having a pressure differential on opposite sides of the seal.

Another important object of the invention is to provide a new and improved sealing assembly of the character described wherein the sealing area is relatively small with a high concentration of pressure maintaining a fluid-tight seal.

Another object of the invention, generally stated, is to provide an improved sealing assembly for a rotatable drum assembly and a stationary valve housing in pulp washers and filters of the rotary drum type, such as those disclosed in Nyman Patent No. 2,362,300 and my co-opending application, Serial No. 707,228, filed January 6, 1958, wherein a vacuum is imposed within the valve housing, and wherein the annularly-shaped joint to be sealed is relatively large, i.e., the diameter being in the order of four feet or larger.

A more detailed object of the invention is to provide a new and improved sealing assembly for a rotary drum-type pulp washer and filter in the form of an annular sealing member carried on a ported end plate of the rotary drum adjacent the outer periphery thereof and having a flexible lip urged into sealing engagement with the outer surface of a stationary cylindrical housing by the pressure differential resulting from the vacuum imposed within the housing, and an annular rigid backing member on the end plate for supporting a major portion of the flexible lip of the sealing member whereby only the outermost edge of the lip is in sealing contact with the housing, thus improving the wear characteristics of the lip and preventing it from acting as a brake tending to slow down the rotation of the drum.

Another object of the invention is to provide a new and improved sealing assembly of the character described wherein the annular sealing member is of the split type with the ends thereof being held in abutting engagement by means of an annular spring associated therewith.

A still further object of the invention is to provide a new and improved sealing assembly of the character described wherein the cost of seal maintenance and drum operation is low inasmuch as the backing member substantially reduces the wear and braking action of the sealing member, wherein the sealing member may be easily replaced when it does become worn without disassembling a substantial portion of the pulp washer and filter, and wherein the sealing assembly is economical to produce and install.

Another object of the invention is to provide a sealing assembly of the general character described herein wherein the sealing member is mounted on the stationary housing adjacent the open end thereof and includes a portion providing a fluid-tight seal between the housing and the tank of liquid in which the drum rotates and a lip portion for providing a fluid-tight seal with the ported end plate of the rotary drum, the lip portion having a rigid backing strip associated therewith whereby only the outer edge of the lip portion is in sealing contact with the end plate of the drum.

Certain other objects of the invention will, in part, be obvious, and will in part appear hereinafter.

For a more complete understanding of the nature and scope of the invention reference may now be had to the accompanying drawings wherein:

FIG. 1 is a vertical section taken through one end of a pulp washer and filter of known type, illustrating one embodiment of the invention;

FIG. 2 is a view on enlarged scale of the portion of FIG. 1 enclosed generally within the broken line circle A;

FIG. 3 is a view on enlarged scale of the portion of FIG. 1 enclosed generally within the broken line circle B; and FIG. 4 is a fragmentary vertical section to the same scale as FIGS. 2 and 3 of another embodiment of the invention.

The pulp washer and filter, a portion of which is shown in FIG. 1, is of the rotary drum type such as those disclosed in Nyman Patent 2,362,300 and my co-pending application, Serial No. 707,228, filed January 6, 1958. In FIG. 1, there is shown a vat or tank 10 having an end wall 11 and a bottom 12 with the end wall 11 having a ring plate 11' bolted to the margin of an opening formed therein whereby to define a circular opening 13 in the end wall 11. The tank 10 is adapted to hold a liquid such as pulp slurry to be washed and filtered in the pulp washer and filter. A rotary filter drum, designated generally at 14, is supported for rotation in the tank 10. The drum 14 has a tubular center shaft 15 provided on each end with a trunnion 16 and a drum end wall 17 which is strengthened by web members 18 secured to the trunnion 16. The outer end of the trunnion 16 shown in FIG. 1 is interconnected by a key 19 to a shaft 20 which is rotatably supported in a pillow-block bearing 21 which is mounted on suitable pier structure, designated generally at 22, disposed adjacent the end of the tank 10. Suitable drive means may be provided at the opposite end of the drum 14 for rotating the same within the tank 10 at suitable speeds.

The drum 14 may be of the type which is circumferentially sub-divided into a plurality of sectors extending lengthwise thereof, each sector being connected through suitable conduits 24 to ports 25 formed in a manifold or end plate 26 which is mounted in the end wall 17 of the drum 14.

A cylindrical suction housing or discharge head 23 is stationarily positioned with an open end adjacent the end of the rotatable drum 14 with a novel sealing arrangement being provided between the open end of the housing 23 and the rotating end plate 26 radially beyond the ports 25 whereby to withdraw fluid or liquor from a layer of pulp or filter cake formed and carried on the outer surface of the drum 14. The stationary housing 23 is provided with an outer wall 28 having a central opening 29 formed therein to receive the outer end of the trunnion 16. As will be explained hereinafter, a novel sealing arrangement is also provided between the rotatable trunnion 16 and the opening 29 in the outer wall 28 of the housing 23. The housing 23 is provided at the top with a suction opening 31 which is adapted to be connected to a source of suction and at the bottom with an opening 32 for discharging fluid or liquor withdrawn from the layer of pulp or filter cake formed on the outer periphery of the drum 14. During the operation of the pulp washer and filter, the housing 23 is maintained under continuous suction or vacuum.

In the particular pulp washer and filter shown in FIG. 1, a valve structure 34 is provided in the housing 23 for controlling the sequential application of suction to the ports 25 in the end plate 26. The valve structure 34 is urged against the end plate 26 by a series of spring loaded plungers such as the one identified by reference numeral 35. A separate discharge pipe 36 is provided for the valve structure 34. A complete and detailed disclosure of the structure and operation of the valve structure 34 may be found in my before mentioned co-pending application but is not provided herein as it forms no part of the present invention.

An annular sealing gasket 38 is provided between the outer surface of the stationary housing 23 and the stationary opening 13 formed in the end wall 11 of the tank 10 whereby to prevent leakage of the liquid material from the tank 10 at this point. As best shown in FIG. 2, the sealing gasket 38 is seated in an annular notch or groove 39 formed in the inner edge of the ring plate 11' defining the opening 13.

The invention is particularly concerned, however, with the provision of fluid-tight seals between the rotatable end plate 26 of the drum 14 and the open end of the stationary housing 23, and between the outer surface of the outer end of the rotatable trunnion 16 and the opening 29 formed in the outer wall 28 of the housing 23. An effective seal assembly has now been devised which substantially reduces the problem encountered in sealing a joint between a pair of relatively movable large diameter members having a pressure differential on opposite sides of the joint. With such prior seals there is a definite tendency for the sealing member which is mounted on one of the members to be tightly urged by the pressure differential against the other one of the relatively movable members whereupon the sealing member tends to bind or drag and act as a brake between the relatively movable members, thus increasing wearing of the sealing member and the power requirements for operating the particular device. With pulp washers and filters of the type disclosed herein, the sealing members required between the housing 23 and the end plate 26 must be relatively large, i.e., in the order of four feet in diameter or larger, hence the drag can exert considerable braking action.

As best shown in FIG. 2, the improved sealing assembly includes an annular rigid bracket 42 which is attached by suitable means to the outer face of the end plate 26 radially beyond the ports 25 formed therein, and an annular sealing member or gasket 43 which is formed of rubber or rubber-like material. The member 43 may either be endless or it may be split with the ends brought together. The sealing member 43 is mounted in the bracket 42.

The bracket 42, as viewed in FIG. 2, is generally C-shaped with the vertical leg portion of the C being disposed against the end plate 26 and with the upper transverse portion extending away from the end plate 26 closely adjacent to the outer surface of the housing 23 to define a rigid, generally wedge-shaped outwardly projecting flange 45. The inner cylindrical surface 41 of the flange 45 is coaxial with the outer surface of the housing 23, with the tapered surface 44 thereof being inclined inwardly and away from the end plate 26 whereby the surface 44 intersects the inner surface 41 closely adjacent to the housing 23.

The annular sealing member 43 is characterized by a main body portion 46 which is seated in the bracket 42 and by an integral flexible lip 50 which extends toward the housing 23. The body portion 46 is secured in the bracket 42 by an annular collar 47 which is attached to the bracket 42 by a series of bolts 48. The major body portion of the lip 50 is supported against the inclined surface 44 of the wedge-shaped backing flange 45 of the bracket 42 whereby only the outer edge of the lip 50 is in sealing contact with the outer surface of the housing 23, as at 51, to provide substantially a line sealing contact therebetween. The lip 50 is held in sealing contact with the housing 23 as a result of the pressure differential between the interior of the housing 23 and the outside thereof. With a vacuum maintained within the housing 23, the atmospheric pressure acts on the outside to urge or hold the lip 50 against the outer surface of the housing 23 to provide a fluid-tight sealing engagement therebetween. The rigid wedge-shaped backing flange 45 of the bracket 42 prevents the major body portion of the lip 50 from being urged against the housing 23 and sustains a substantial portion of the atmospheric pressure exerted on the lip 50 whereby to substantially reduce the tendency of the lip 50 to act like a Prony brake opposing the rotation of the drum 14.

Inasmuch as the sealing member 43 required for a pulp washer and filter unit of the type shown in FIG. 1 may have a diameter in the order of four feet or more, such sealing members are often of the split-type since they are simpler to remove and replace when this becomes necessary. To retain the split ends of a split-type sealing member 43 in abutting engagement, an annular spring 53 is provided in surrounding engagement with the outer surface of the lip 50 of the sealing member 43, as illustrated in FIG. 2.

A similar sealing assembly is provided between the opening 29 in the outer wall 28 of the housing 23 and the outer surface of the trunnion 16, as illustrated in FIG. 3. An annular bracket 55, which is substantially identical to the bracket 42 shown in FIG. 2, is secured by suitable means in the opening 29 in the outer wall 28. A wedge-shaped backing flange 56 is integral with the bracket 55 and an annular sealing gasket 57 formed of rubber or rubber-like material is disposed in the bracket 55 and held therein by suitable plate means 58. A lip 59 of the sealing gasket 57 has its main body portion disposed against an inclined surface of the backing flange 56 whereby its outermost edge is disposed in sealing contact with the rotatable trunnion 16, as at 60. An annular spring 61 may be provided if the sealing gasket 57 is of the split-type.

As described in connection with the sealing bracket 43 illustrated in FIG. 2, the pressure differential resulting from the vacuum maintained within the housing 23 and atmospheric pressure externally of the housing 23 acts to urge the outermost edge portion of the lip 59 of the sealing member 57 into engagement with the outer surface of the trunnion 16 to provide a fluid-tight seal therebetween. The backing flange 56 substantially reduces the tendency of the lip 59 to act as a Prony brake on the rotating trunnion 16 by permitting only the outer edge of the lip 59 to be urged by the pressure differential into fluid-tight sealing engagement with the trunnion 16, thus substantially reducing the frictional engagement therebetween.

Another embodiment of the invention is illustrated in FIG. 4 and is directed to a combination or two-way sealing assembly for providing fluid-tight seals between an end wall 62 of a slurry tank and the outer surface of a stationary housing or discharge head 63 and between a ported end plate 64 of a rotary drum and the outer surface of the housing 63. The end wall 62, the stationary housing 63, and the end plate 64 correspond, respectively, to the end wall 11, the stationary housing 23, and the end plate 26 of the embodiment of the invention shown in FIGS. 1 and 2. An annular L-shaped bracket 65 is mounted in an opening formed in the end wall 62 of the tank in spaced relationship relative to the outer surface of the housing 63. The open end of the housing 63 is provided with an integral wedge-shaped flange or backing portion 66 which extends closely adjacent to the outer periphery of the end plate 64 and is provided with an inwardly inclined surface 67 on the outer periphery thereof. The wedge-shaped backing portion 66 may, if desired, be formed separately from the housing 63 and then be attached thereto by suitable fastening means. The inclined surface 67 may be described as a frusto-conical surface the apex of which lies on the horizontal axis of the drum inwardly of the end plate 64. The flange portion 66 terminates away from the end plate 64 with an outwardly projecting shoulder 68.

An annular sealing member 69 formed of rubber or rubber-like material is characterized by a body portion 70 which is seated between the outer surface of the housing 63 and the horizontal portion of the bracket 65 and against the shoulder 68. The body portion 70 provides a fluid-tight seal between the end wall 62 of the tank and the outer surface of the housing 63 to prevent leakage of the liquid pulp mixture from the tank. The sealing member 69 is further characterized by an integral flexible lip 71 the major body portion of which is disposed against the inclined surface 67 of the flange portion 66 whereby only the outermost edge portion is in sealing contact with the outer periphery of the end plate 64, as at 72. The sealing member 69 takes the place of both the sealing gasket 38 and the sealing gasket 43 of the embodiment of the invention illustrated in FIGS. 1 and 2.

The pressure differential resulting from the vacuum maintained within the housing 63 and the atmospheric pressure externally thereof acts to retain the outermost edge of the lip 71 against the outer periphery of the end plate 64 whereby to provide a fluid-tight seal between the relatively rotatable housing 63 and end plate 64. As previously described herein, the wedge-shaped flange portion 66 effectively prevents the major body portion of the lip 71 from being urged against the outer periphery of the end plate 64 and thus substantially reduces the tendency of the lip 71 to act as a Prony brake opposing rotation of the drum end plate 64 by reducing the frictional engagement therebetween. The rigid wedge-shaped portion 66 serves to absorb a substantial portion of the atmospheric pressure exerted against the lip 71 and thus reduces wearing of the outermost edge of the lip 71.

As the sealing member 69 may be of the split-type, the body portion 70 thereof may be provided with an annular groove 73 which is adapted to receive an annular spring 74 for retaining the split ends of the sealing gasket 69 in abutting engagement.

Obviously, the brackets 42 and 55 illustrated in FIGS. 1, 2 and 3 may be eliminated by providing suitable annular recesses in the end plate 26 and in the outer wall 28 of the housing 23 for receiving, respectively, the sealing members 43 and 57. Such recesses would be provided adjacent their inner edges with projecting wedge-shaped flange portions for backing up and supporting the major body portions of the lips 50 and 59 of the sealing gaskets 43 and 57, respectively.

It will be understood that certain changes may be made in the construction or arrangement of the sealing assemblies disclosed herein without departing from the spirit and scope of the invention as defined in the appended claims.

I claim:

1. In a pulp washer and filter installation wherein a drum is rotatable relative to the open end of a cylindrical housing having a vacuum maintained therein, a sealing assembly for an annular clearance space defined therebetween comprising, an annular bracket carried on the end of the drum outwardly of said housing and having an annular recess formed therein and opening away from said annular clearance space and toward the higher pressure side thereof, said bracket having a rigid annular wedge-shaped flange projecting outwardly toward the housing from the inner edge of said recess with the inner surface of said flange being disposed closely adjacent to and generally concentric with the outer surface of said housing and with the outer surface of said flange being generally conically inclined inwardly toward the housing in a direction toward said higher pressure side of said clearance space and intersecting said inner surface of said flange, and an annular sealing member having a base portion seated in said recess and a flexible lip characterized by an inner surface disposed flush against said outer inclined surface of said flange and by an outer surface disposed substantially at the same inclination as said inclined surface of said flange, said flexible lip being further characterized by an angular outer edge portion extending beyond said flange and disposed on the higher pressure side of said annular clearance space, the pressure differential resulting from the vacuum within the housing and atmospheric pressure externally thereof acting directly and normally against said outer inclined surface of said flexible lip of said sealing member whereby to positively and simultaneously retain said flexible lip of said sealing member against said inclined surface of said flange and said angular outer edge portion of said lip against the outer surface of the housing to provide substantially a line sealing contact therewith, said rigid flange preventing the major body portion of said flexible lip from being forced against the outer surface of the housing whereby to substantially reduce the tendency of the lip to act as a friction-brake between the housing and the rotating drum.

2. In a pulp washer and filter installation having a drum rotatable about a horizontal axis in a tank of liquid and a stationary cylindrical housing having a vacuum maintained therein and having an open end disposed in an opening formed in the end of the tank and juxtaposed with an end plate of the drum, a sealing assembly providing fluid-tight seals for annular clearance spaces defined between the end plate of the rotatable drum and the stationary housing and between the opening in the end of the tank and the housing comprising, a rigid annular wedge-shaped backing strip at the open end of the housing and extending therefrom toward the end of the drum, said wedge-shaped backing strip being characterized by an inner surface which extends closely adjacent to the outer periphery of the end plate of the drum and generally concentric therewith and by an inwardly inclined generally conical outer surface, and an annular sealing member having a base portion disposed between said backing strip and the edge of the opening in the tank in which the end of the housing is disposed for providing a fluid-tight seal between the housing and the tank, said sealing member being further characterized by an integral flexible lip disposed on the higher pressure side of said annular clearance space between the end plate of the rotatable drum and the stationary housing, the major portion of said lip being disposed against the outer inclined surface of said backing strip with an outer angular edge of said lip extending beyond the outer inclined surface of said backing strip and toward the outer periphery of the end plate of the drum, said lip having a conically inclined outer surface with substantially the same inclination as the outer inclined surface of said backing strip whereby the major portion of said lip is positively retained against the outer inclined surface of said backing strip and the outer angular edge of said lip is positively retained in line contact sealing engagement with the outer periphery of the end plate of the drum by the pressure differential resulting from the vacuum maintained within the housing and atmospheric pressure externally thereof acting directly and normally against said conically inclined outer surface of said lip, thus providing a fluid-tight seal between the stationary housing and the rotatable drum, said wedge-shaped backing strip reducing the tendency of said flexible lip to act like a friction-brake opposing rotation of the drum.

References Cited in the file of this patent

UNITED STATES PATENTS

| | | |
|---|---|---|
| 2,362,300 | Nyman | Nov. 7, 1944 |
| 2,368,744 | Carey | Feb. 6, 1945 |
| 2,398,376 | Hillman | Apr. 16, 1946 |
| 2,523,604 | Vedovell | Sept. 26, 1950 |
| 2,750,212 | Skinner | June 12, 1956 |

FOREIGN PATENTS

| | | |
|---|---|---|
| 453,908 | Canada | Jan. 4, 1949 |
| 441,732 | Great Britain | Jan. 24, 1936 |
| 742,211 | Great Britain | Dec. 21, 1955 |